United States Patent [19]

Gullett

[11] Patent Number: 5,762,788
[45] Date of Patent: Jun. 9, 1998

[54] FLUID FILTER HAVING A REUSABLE FILTER HOUSING AND A REPLACEABLE CORELESS FILTER ELEMENT

[75] Inventor: David F. Gullett, Peoria, Ill.

[73] Assignee: Caterpillar Inc., Peoria, Ill.

[21] Appl. No.: 696,643

[22] Filed: Aug. 12, 1996

[51] Int. Cl.$^6$ ............................................. B01D 35/02
[52] U.S. Cl. ..................... 210/232; 210/248; 210/440; 210/442; 210/444; 210/450; 210/453; 210/455; 210/457
[58] Field of Search ............................. 210/232, 248, 210/440–442, 450, 453, 455, 457, 443, 444

[56] References Cited

U.S. PATENT DOCUMENTS

5,589,060 12/1996 Gebert et al. ........................ 210/457

*Primary Examiner*—Matthew O. Savage
*Attorney, Agent, or Firm*—Pankaj M. Khosla

[57] ABSTRACT

A reusable fluid filter assembly includes a cylindrical housing, a top plate assembly, a top plate attachment member, and a replaceable coreless filter element. The housing has means for sealingly engaging the housing to the top plate, and a hollow central core having an open first end and being connected to the closed end of the housing at the second end. The central core has a plurality of fluid outlet perforations. The top plate has a rim, fluid inlet means and fluid outlet means extending through the top plate. The top plate attachment member has a tubular shape, and a fluid outlet port extending through it. The coreless filter element having annular end caps on first and second open ends is disposed in the housing. The fluid inlet means of the top plate are in fluid communication with a fluid inlet chamber defined by the filter element and housing. The central core extends into the first open end of the filter and the hollow cylindrical chamber of the filter element. The fluid outlet perforations of the central core are in fluid communication with the hollow cylindrical chamber. The central core is threadedly connected sealingly engages the first and second open ends of the filter element. The open first end of the hollow central core is threadedly connected to the fluid outlet port extending through the attachment member.

20 Claims, 7 Drawing Sheets

Fig_1_

Fig_2_

Fig_3a_

Fig_3b_

Fig_3_

Fig_4_

Fig_5_

Fig_6_

Fig_7_

Fig_8_

FLUID FILTER HAVING A REUSABLE FILTER HOUSING AND A REPLACEABLE CORELESS FILTER ELEMENT

TECHNICAL FIELD

The present invention relates generally to fluid filters, and more particularly to a spin-on type fluid filter having a reusable filter housing and a replaceable coreless filter element.

BACKGROUND ART

Filter assemblies for filtering liquids such as engine oil, hydraulic oil and fuel are well known in the art. An oil filter assembly is typically installed in the oil lines of an internal combustion engine to remove grit and other contaminants from the engine lubricating oil to provide a longer engine life and improved engine performance.

A typical oil filter assembly has a housing which contains a filter element used for filtering the oil as it circulates through the housing. The housing ordinarily has a first end adapted for coupling the filter assembly to the engine block of the internal combustion engine by means of an internally threaded fluid exit port that threads onto a corresponding externally threaded configuration on the engine block. The housing also has a second end which is ordinarily closed. The fluid exit port is ordinarily centrally located in a housing cover which is permanently, peripherally attached to the first end of the housing. Contaminated oil flows into the filter housing through fluid inlet holes located in the cover and surrounding the fluid exit port, and clean, filtered oil flows out of the filter housing through fluid exit port. The filter housing is sealed against the engine block by using an elastomeric gasket which surrounds the inlet holes and the exit port. Fluid filters with such an attachment configuration are generally referred to in the art as "spin-on" type filters.

Disposable or "throw away" type fluid filters are known in the art. The filter element is permanently sealed inside the filter housing. When the filter element has become clogged, the entire filter assembly is removed and discarded and a new filter assembly is put in its place. This type of a filter represents a waste of natural resources, labor and materials because an entirely new filter assembly must be used each time the old filter assembly is serviced, even though it is only the filter element that has been expended and the other parts of the filter, such as the housing, top plate and seals have not yet exceeded their useful life.

A fluid filter assembly having a detachable cover and housing to permit the replacement of the filter element is also known in the art. U.S. Pat. No. 5,342,519 discloses such a fluid filter assembly for engine oil application, for example.

A common problem with reusable filter units such as of the type described above, is that the replaceable filter element has a hollow central core, formed of a perforated tube, as an integral part of the element. This tube is typically constructed from a metal, such as steel or even paper reinforced with a resin, such as a phenolic resin for example. When the filter element has to be periodically replaced, it is only because the filtration media has reached the limit of its filtration capacity and not because the center tube has reached the end of its service life. Usually, the perforated center tube has a much longer service life available because it comes into contact with only the clean filtered oil that flows through it. When the entire filter element is thrown away, a perfectly functional and useful center tube is also thrown away. This represents a waste of natural resources and an undue burden on the landfills and the environment. Although one method of disposal of used filter elements is by incineration in a furnace, this method is most effective only where the center tubes are made of a resin impregnated paper based material. If the center tube is made of metal, as is the case in a majority of filter elements, incineration of the filter element still does not resolve the problem of the disposal of metal center tubes. Hence, the filter industry is presented with the challenging task of designing and manufacturing environmentally friendly filters in the face of pending tougher environmental regulations.

It has been desirable to have a reusable filter housing design that allows for environmentally safe collection and disposal of the dirty oil and also allow for safe removal of the replaceable filter element. It has further been desirable to have a filter assembly having a reusable center tube that allows the use of a coreless filter element to avoid the unnecessary waste of materials and natural resources. It has also been desirable to have a replaceable filter housing design that facilitates quick and easy removal of the expended filter element and installation of a new filter element to avoid the unnecessary waste of time and labor.

The present invention is directed to overcome one or more problems of the heretofore utilized replaceable filter element and reusable filter housing assemblies.

DISCLOSURE OF THE INVENTION

In one aspect of the present invention, a reusable fluid filter assembly is provided. The filter assembly comprises a cylindrical housing having an annular peripheral wall, an open end, a closed end, and sealing engagement means for sealingly engaging the housing to a top plate assembly. The cylindrical housing further includes a hollow central core having a tubular shape, an inner surface, an open first end having a first outer surface, a middle portion having a middle outer surface and a plurality of fluid outlet perforations extending from the inner surface to the middle outer surface. The cylindrical housing also includes a second end having a second outer surface. The first end is disposed in the open end of the housing. The second end is connected to the closed end of the housing.

The filter assembly further comprises a top plate assembly having a rim, fluid inlet means and fluid outlet means extending through the top plate assembly, and corresponding sealing engagement means for sealingly engaging the top plate assembly to the housing.

The filter assembly also comprises a top plate attachment member having a tubular shape, an outer surface, a pilot end having internal threads for threading onto corresponding external threads on the filter mounting base, and a fluid outlet port extending through the attachment member.

The filter assembly still further comprises a replaceable coreless filter element disposed in the housing to define a fluid inlet chamber between the filter element and the housing. The filter element has a hollow cylindrical fluid outlet chamber which opens to a first open end of the filter element, allowing filtered fluid to flow therefrom, and having a second open end. The filter element has an outer diameter that is smaller than the inner diameter of the housing to allow removal of the filter element through the open end of the housing. The filter element has an inner diameter that is larger than the outer diameter of the hollow central core to allow the hollow cylindrical chamber to accept the hollow central core therein.

The fluid inlet means of the top plate are in fluid communication with the fluid inlet chamber defined by the filter element and housing. The hollow central core extends into the first open end and the hollow cylindrical chamber of the filter element. The fluid outlet perforations of the hollow central core are in fluid communication with the hollow cylindrical chamber of the filter element. The first and second outer surfaces of the hollow central core sealingly engaging the first and second open ends of the filter element respectively.

The first end of the hollow central core has threads adjacent the open first end for mating with corresponding threads adjacent the fluid outlet port of the attachment member. The housing is removably connectable to the top plate attachment member.

BEST MODE FOR CARRYING OUT THE INVENTION

Figure 1:
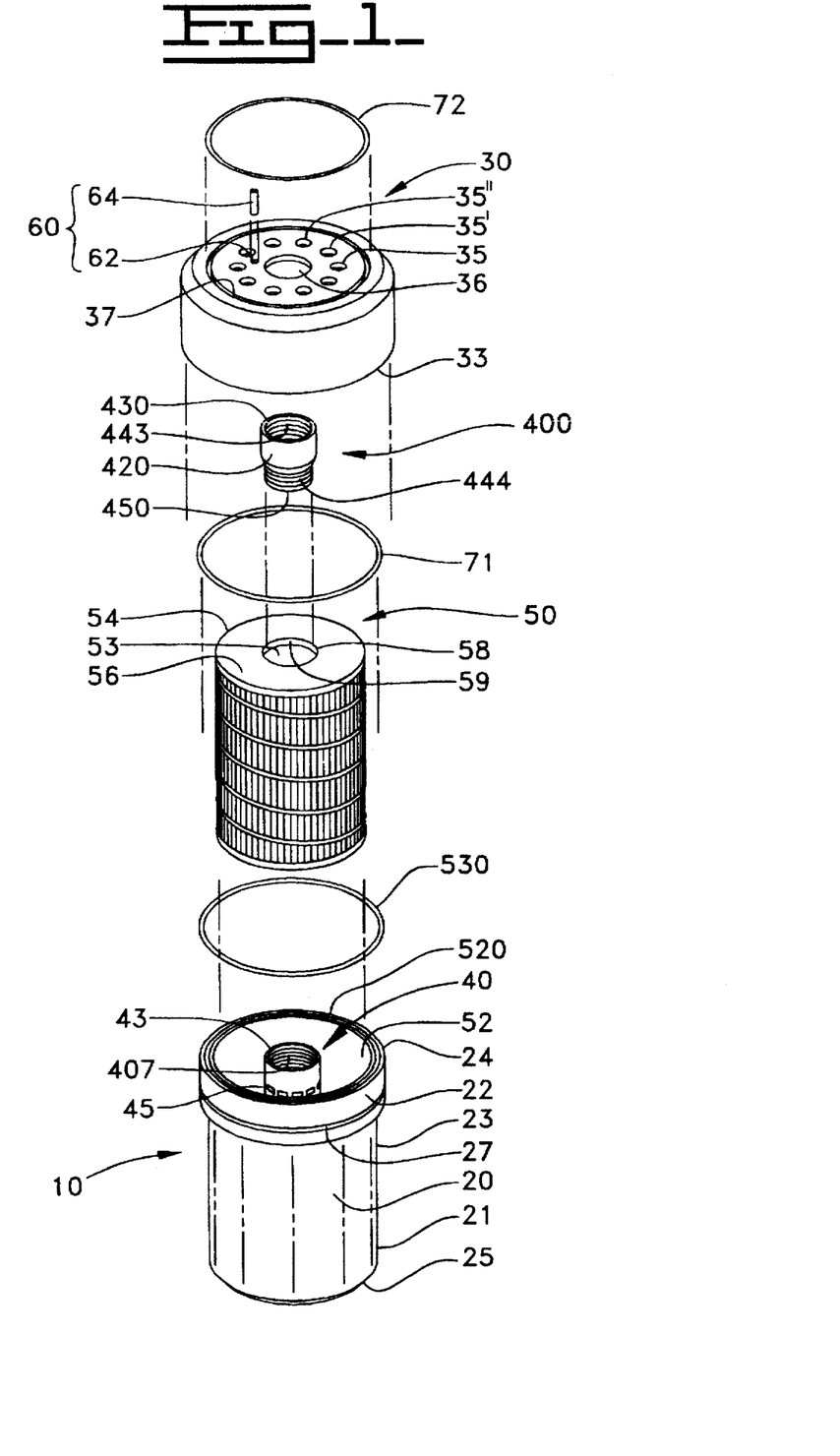
FIG. 1 is an exploded perspective view of a reusable fluid filter assembly including a cylindrical housing, a top plate assembly, a top plate attachment member, and a replaceable coreless filter element, according to the preferred embodiment of the present invention.

Referring to FIG. 1, an exploded perspective view of a reusable fluid filter assembly 10 is shown, which includes a cylindrical housing 20 having a hollow central core 40, a top plate assembly 30, a top plate attachment member 400, and a replaceable coreless filter element 50, according to one embodiment of the present invention. While the preferred embodiment is intended for use as an engine oil filter for internal combustion engines, the filter could be used for a variety of different applications, depending upon the type of filtration media used, for filtering fluids such as hydraulic oil, fuel, and water.

The cylindrical housing 20 has an annular peripheral wall 21, an open end 24 and a closed end 25. The housing 20 has sealing engagement means 200 for sealingly engaging the housing 20 to the top plate 30, and a hollow central core 40 attached to the closed end 25. The hollow central core 40 has threads 406,407 (shown in FIG. 7 and FIG. 8) for mating with corresponding threads 443,444 respectively (shown in FIG. 7 and FIG. 8) adjacent the fluid outlet port 450 of the top plate attachment member 400.

In a preferred embodiment, housing 20 has a first wall portion 22 and a second wall portion 23. The first wall portion 22 starts at the open end 24 of the housing 20 and extends for an axial length, desirably no greater than about one-third the outer diameter of the housing 20. The thickness of the first wall portion 22 is desirably, at least 50% greater than the thickness of the second wall portion 23 because external threads 26 are present on the first wall portion 22 and thus, the greater wall thickness gives the first wall portion greater mechanical strength. In another preferred embodiment, the first wall portion 22 starts at the open end 24 of the housing 20 and extends for an axial length, desirably no greater than about 50 mm, and preferably, no greater than about 40 mm. In the preferred embodiment, the housing 20 is fabricated as a single unit from stainless steel by deep drawing and spinning techniques which are well known to those skilled in the art. Other materials and manufacturing techniques may be employed, for example, a molded plastic housing having an integrally molded hollow central core connected to the housing may be fabricated. In the preferred embodiment, the first wall portion 22 has a thickness, desirably in the range of about 3 mm to about 4 mm and preferably, about 3.5 mm and the second wall portion 23 has a thickness, desirably in the range of about 1 mm to about 2 mm, and preferably, about 1.5 mm. A first wall portion thickness less than 3 mm is undesirable because if the wall is too thin and after external threads are machined therein, the structural integrity of the stainless steel housing and the repeatability of its use would be compromised. Similarly, a second wall thickness less than about 1 mm is undesirable from a structural integrity and durability standpoint. A first wall portion thickness greater than about 4 mm and a second wall thickness greater than about 2 mm is undesirable because it presents practical limitations on the fabrication of the housing and also represents a waste of labor and materials as far as the intended use of the preferred embodiment is concerned. However, in certain applications, one may find it necessary to use an even greater wall thickness, especially for extremely large sized filter assemblies.

It must be understood that the cylindrical housing and hollow core may be fabricated as a single unit by molding from an organic plastic material, such as a polyester resin, by techniques such as injection molding, for example. The thickness of the cylindrical housing walls can be appropriately sized based on the anticipated working pressure of the filter housing. Such thickness determinations can be obtained without undue experimentation by one skilled in the art.

Figure 2:
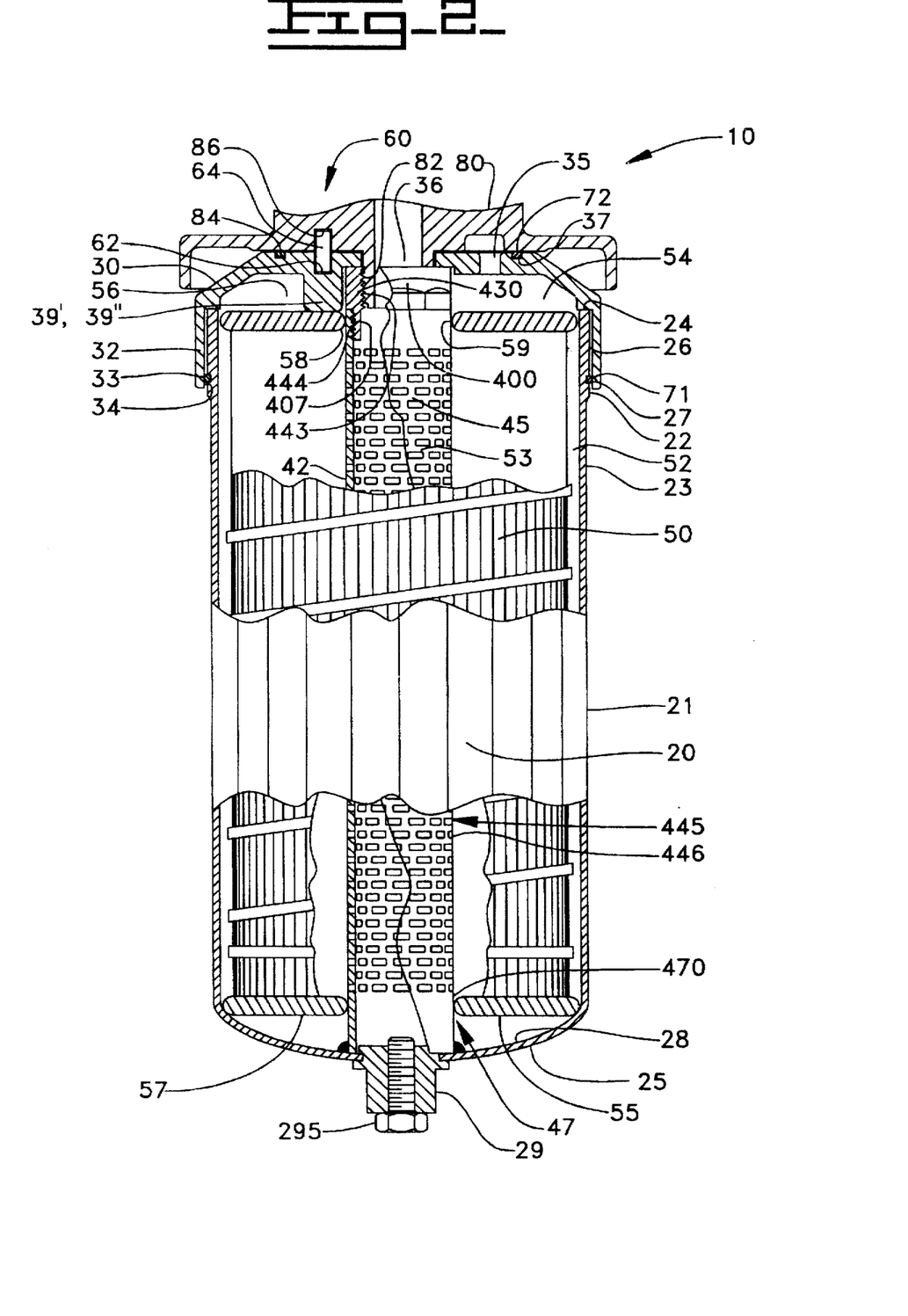
FIG. 2 is a diagrammatic side view of the reusable fluid filter assembly according to an embodiment of the present invention, when assembled, a portion thereof being shown in section and a portion thereof being broken away.
Figure 3:
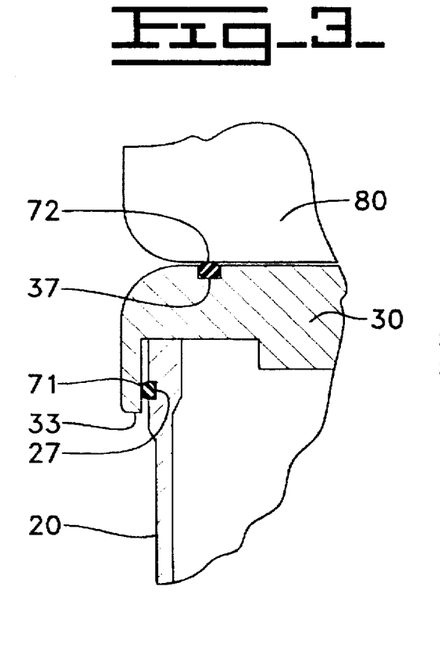
FIG. 3a is an enlarged portion of FIG. 2, showing the sealing engagement of the cylindrical housing to the top plate assembly, the threaded connection of the top plate attachment member to the mounting block, thereby urging the top plate towards the block, indexing means for preventing relative rotation of the top plate with respect to the filter mounting base, and the threaded connection of the hollow central core to the top plate attachment member, according to the preferred embodiment of the present invention.
FIG. 3b is an enlarged portion showing the closed end portion of the cylindrical housing, the annular elastomeric end cap on the open second end of the coreless filter element being biased against the interior surface of the housing, and the resilient inner edge of the annular end cap being biased against the second outer surface of hollow central core which is attached to the closed end of the housing, according to the preferred embodiment of the present invention.
FIG. 3c, FIG. 4, FIG. 5, and FIG. 6 are representative side views of the filter assembly when assembled, portions thereof being shown in section, showing various alternative configurations of the sealing engagement of the cylindrical housing with the top plate assembly, according to alternate embodiments of the present invention.
Figure 3A:
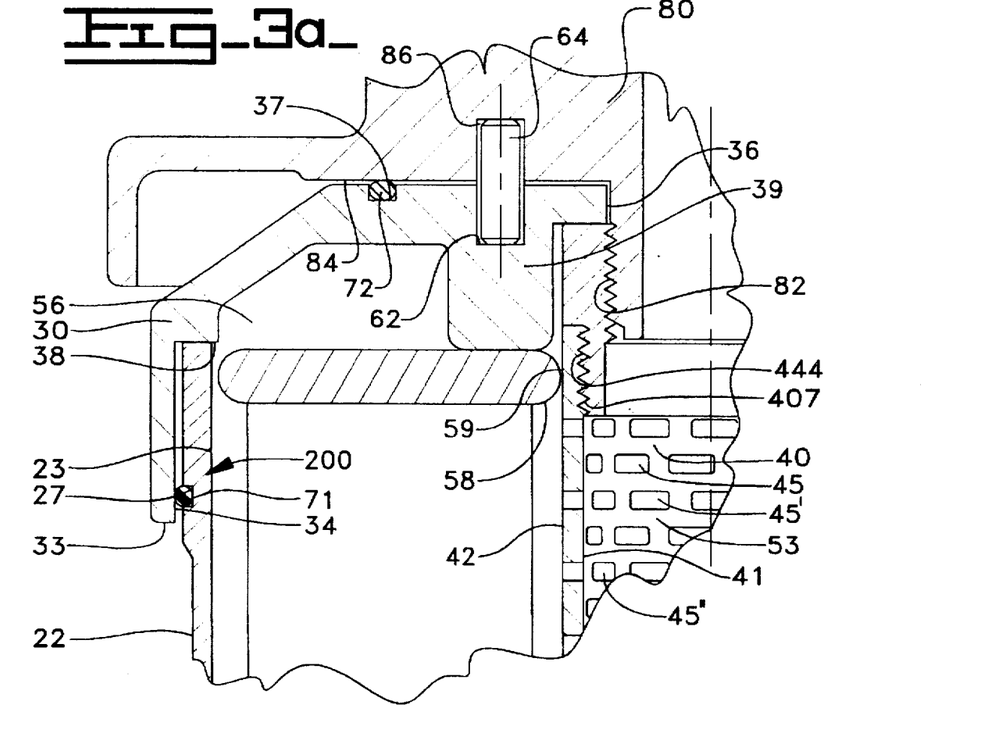

As shown in FIG. 2 and FIG. 3a, in the preferred embodiment of the present invention, the sealing engagement means 200 include a radial annular channel 27 adjacent the open end 24 of housing 20. The annular channel 27 has a depth along the radial direction of the cylindrical housing. A first sealing ring 71 is disposed in the annular channel 27. In the preferred embodiment, the annular channel 27 has a rectangular shape. This shape can however be square, circular or polygonal depending upon the type of sealing ring used. In the preferred embodiment, the first sealing ring 71 has a circular cross section and is made from an injection molded elastomeric material, desirably a nitrile rubber. The sealing ring may have other cross section geometries and may be made from a variety of different elastomers, such as hydrogenated nitrile rubber, for example, depending on the desired elastomer properties such as heat resistance, low compression set and/or low brittle point.

Housing 20 also includes a centrally located drain plug housing 29 permanently fixed, by means such as welding, to the closed end 25 of housing 20, as illustrated in FIG. 2. Drain plug housing 29 includes a threaded drain plug 295 therein. Drain plug housing 29 has an outer surface having the shape of a square or a hexagon to enable it to be gripped by a tool, such as a wrench. Core 40 of housing 20 can be threaded on or off the top plate attachment member 400 by rotating the housing with a tool engaged with the drain plug housing 29, thereby causing core 40 to be threadedly connected to member 400.

In the preferred embodiment, the hollow central core 40 has a tubular shape, an inner surface 41, an open first end 43 having a first outer surface 42, a middle portion 445 having a middle outer surface 446 and a plurality of fluid outlet perforations 45,45',45" extending from the inner surface 41 to the middle outer surface 446. The hollow central core 40 further has a second end 47 having a second outer surface 470. The first end 43 is disposed in the open end 24 of housing and the second end 47 of core 40 is attached to closed end 25 of the housing. The central core 40 is attached to the closed end 25 of the housing 20 by methods such as welding, if the housing is fabricated from metallic materials. If the housing is constructed from plastic materials by processes such as injection molding, the entire housing including the integrally connected core can be molded as a one-piece unit. Preferably, the diameter of surface 42 is equal to the diameter of surface 470.

The diameter of surface 446 is desirably not substantially greater than the respective diameters of surfaces 42,470 and preferably, equal to or less than the respective diameters of surfaces 42,470.

The hollow central core 40 is threadedly connected to the fluid outlet port 450 of the attachment member 400. In the preferred embodiment, and as shown in FIG. 3, core 40 is threadedly connected with the attachment member 400. Member 400 is connected to the top plate assembly 30, thereby connecting the cylindrical housing 20 to the top plate assembly 30 and sealingly engaging housing 20 with top plate 30.

Figure 7:
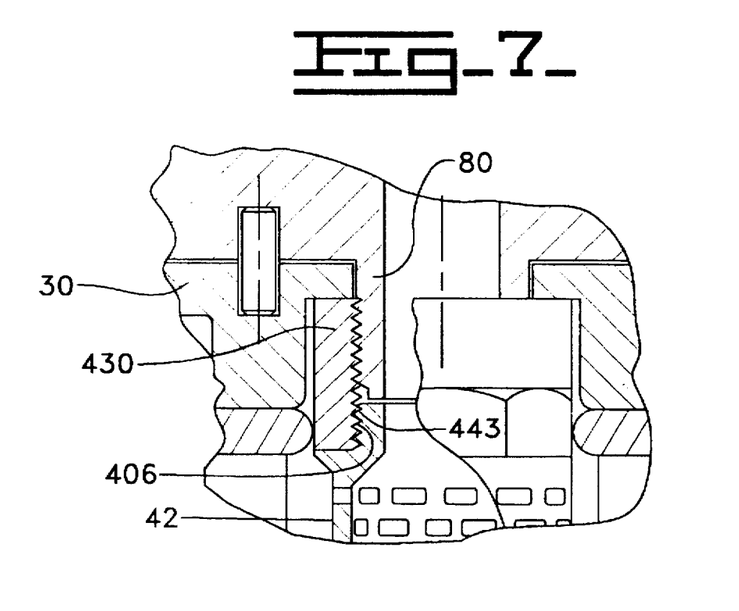
FIG. 7 and FIG. 8 are an enlarged diagrammatic side views of the filter assembly when assembled, a portion thereof being shown in section, showing alternative configurations of the threaded connection of the open first end of the hollow central core with the fluid outlet port of the top plate attachment member, according to alternate embodiments of the present invention.
Figure 8:
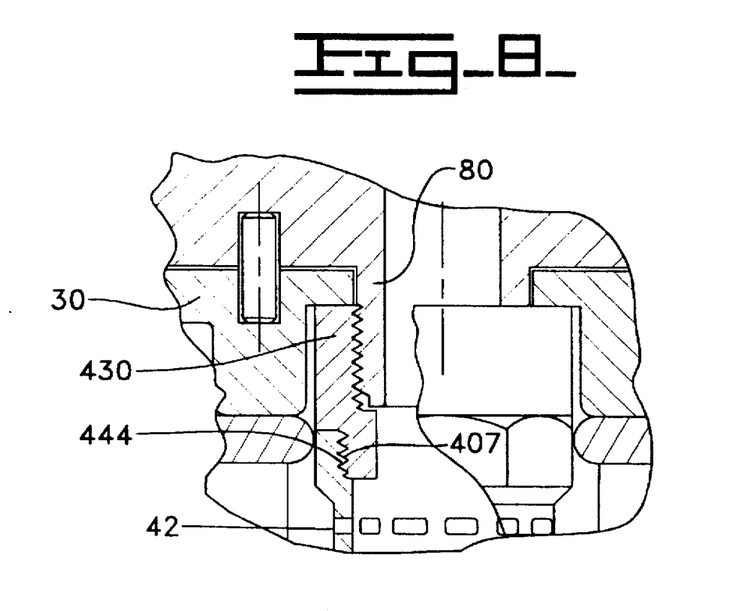

In the preferred embodiment, as shown in FIG. 7, the open first end 43 of core 40 has external threads 406 for threading into corresponding internal threads 443 of attachment member 400. In an alternate embodiment, as shown in FIG. 8, the open first end 43 of core 40 has internal threads 407 for threading into corresponding external threads 444 of attachment member 400.

Figure 4:
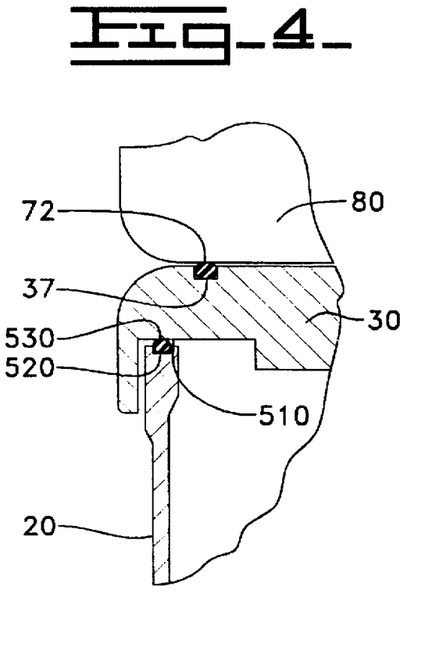

In another embodiment, as shown in FIG. 4 sealing engagement means 200 include an axial annular channel 520 in the housing peripheral wall at the open end 24 of housing 20. The axial annular channel 520 has a depth along the radial direction of the cylindrical housing. A third sealing ring 530 is disposed in the axial annular channel 520. In the preferred embodiment, channel 520 has a rectangular shape. This shape can however be square, circular or polygonal depending upon the type of sealing ring used. In the preferred embodiment, sealing ring 530 has a circular cross section and is made from an injection molded elastomeric material, desirably a nitrile rubber.

Figure 5:
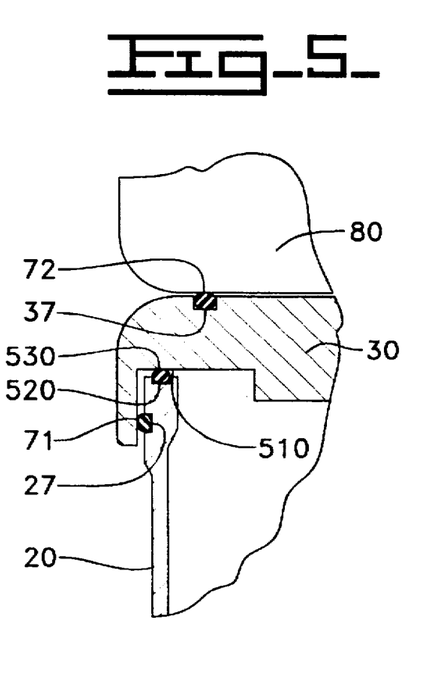
Figure 6:
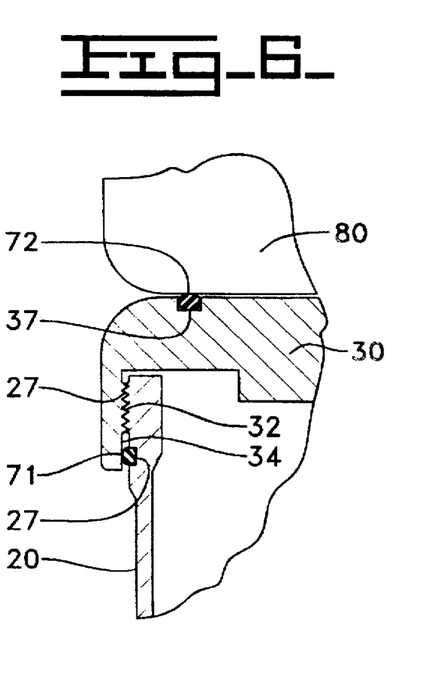

Another embodiment of the sealing engagement is shown in FIG. 5, wherein housing 20 has both radial and annular channels with respective sealing rings placed therein. In yet another embodiment, as shown in FIG. 6, housing 20 is in threaded and sealing engagement with top plate assembly 30. In such a configuration, housing 20 has external threads 26 adjacent open end 24. Threads 26 mate with, corresponding threads 32 on top plate 30. Desirably, threads 26 have a plurality of leads, and preferably at least four leads. This is desirable because it allows core 40 to be threadedly connected to top plate attachment member 400 by threading external threads 406 or internal threads 407 of core 40 into respective internal threads 443 or external threads 444 of member 400, while simultaneously allowing the threading of threads 26 of housing 20 into threads 32 of top plate 30.

Figure 9:
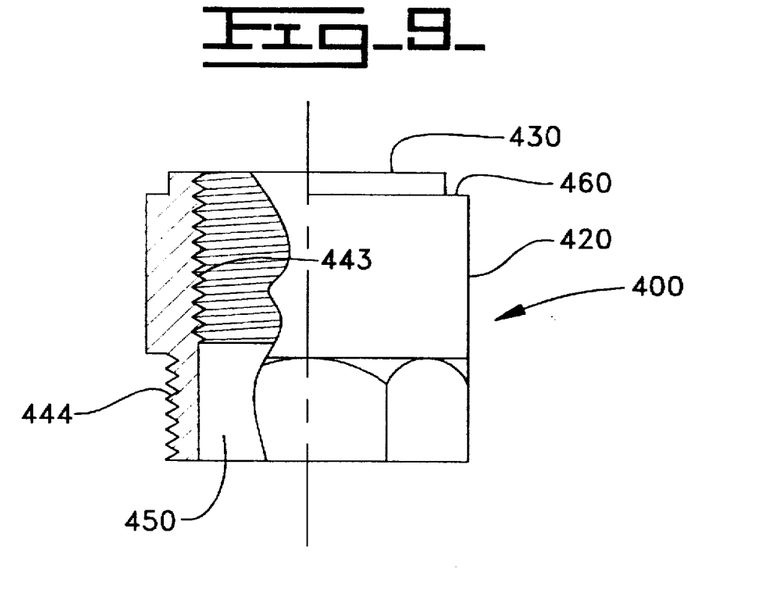
FIG. 9 is a diagrammatic side view of the top plate attachment member, a portion thereof being shown in section, according to one embodiment of the present invention.

The top plate attachment member 400 has a tubular shape, an outer surface 420, a pilot end 430 having internal threads 443 for threading onto corresponding external threads 82 on the filter mounting base 80 and external threads 406 on core 40, and a fluid outlet port 450 extending through the attachment member 400. Referring to FIG. 9 which illustrates an embodiment of the present invention, the member 400 has a pilot diameter, an outer diameter, and a shoulder 460 formed between the pilot diameter and the outer diameter. In this embodiment, the top plate fluid outlet opening 36 has an inner diameter sized to fit loosely around external threads 82 on filter mounting base 80. The pilot diameter of member 400 is desirably of a size sufficient to slip fit inside the inner diameter of the top plate fluid outlet 36 and preferably, about 0.10 mm to 0.50 mm smaller than the inner diameter of outlet 36. The shoulder 460 of member 400 presses against the top plate 30, forming a mechanical contact, and pushes the top plate against the mounting base 80 when the internal threads 443 of the member 400 are threaded into external threads 82 of base 80.

Figure 10:
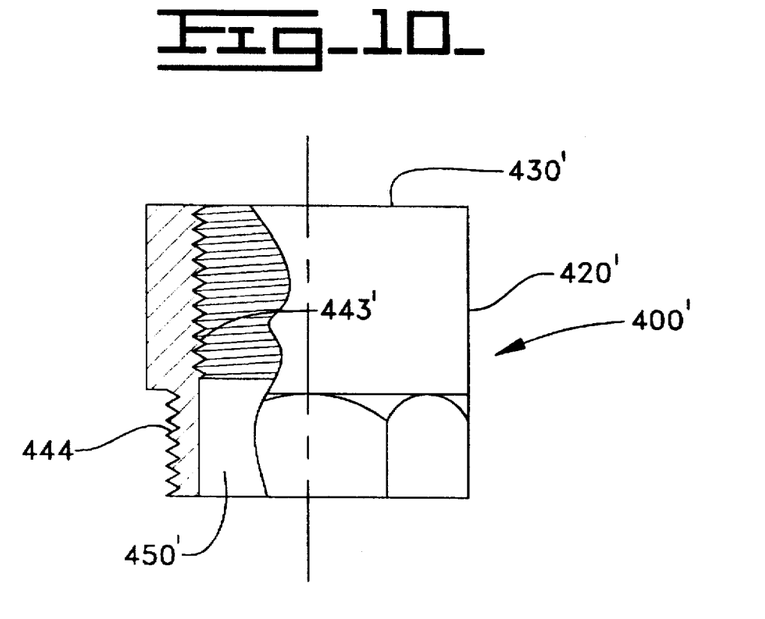
FIG. 10 is a diagrammatic side view of the top plate attachment member, a portion thereof being shown in section, according to a preferred embodiment of the present invention.

In the preferred embodiment, as shown in FIG. 10, the attachment member 400' has an outer surface 420', internal threads 443', and a fluid outlet port 450'. The outer surface diameter of member 400' is greater than the diameter of top plate outlet 36 to facilitate a good mechanical contact with the top plate. Preferably, the outer surface diameter of member 400' is at least about 15 mm greater than the diameter of outlet 36.

In the preferred embodiment, port 450 of attachment member 400 has a surface adapted for being turned by a tool, such as a ratchet wrench or an Allen wrench. As illustrated in FIG. 9 and FIG. 10, such a surface is preferably the outer surface having a hexagonal configuration. It should be recognized however, that a variety of other shapes, such as a square or a polygon could be employed. Further, these shapes could be formed on the inner surface of port 450 as well, particularly when the threaded connection between core 40 and member 400 has the configuration as shown in FIG. 8.

As shown in FIG. 3a, the top plate assembly 30 has a circular shape and a peripheral sealing surface 34 adjacent rim 33 for sealing against sealing ring 71 disposed in radial annular channel 27. In another embodiment, as shown in FIG. 4, assembly 30 has circumferential sealing surface 510 formed on assembly 30 for sealing against sealing ring 530 disposed in axial annular channel 520. In another embodiment, as shown in FIG. 5, top plate 30 has both axial and radial channels. In yet another embodiment, as shown in FIG. 6, assembly 30 has internal threads 32 for mating the external threads 26 of housing 20 and peripheral sealing surface 34 adjacent internal threads 32. The top plate assembly 30 also has a rim 33, and fluid inlet means 35,35',35" (hereinafter referred to as 35) and fluid outlet means 36 extending through the top plate assembly. The top plate assembly 30 has indexing means 60 for preventing rotation of the top plate 30 with respect to a filter mounting base 80 after the top plate has been secured to the filter mounting base. The first sealing ring 71 forms a first seal in cooperation with the peripheral sealing surface 34 of the top plate 30 when the external threads 26 of the housing 20 are threaded into the internal threads 32 of the top plate 30. Preferably, the first sealing ring 71 disposed in the annular channel 27 of the cylindrical housing 20 is biased against the sealing surface 34 to create the first seal.

As illustrated in FIG. 2 and FIG. 3a, in the preferred embodiment of the present invention, the indexing means 60 include a recess 62 in the top plate 30. The recess is adapted to desirably receive means such as a pin, cog or a key for mating with a corresponding recess in the mounting base. The recess 62 is preferably adapted to receive a guide pin 64 for mating with a corresponding recess 86 in the filter mounting base 80. The guide pin 64 is fitted in the top plate recess 62 and the filter mounting base recess 86 when the top plate 30 is sealably attached to the filter mounting base 80.

Figure 11:
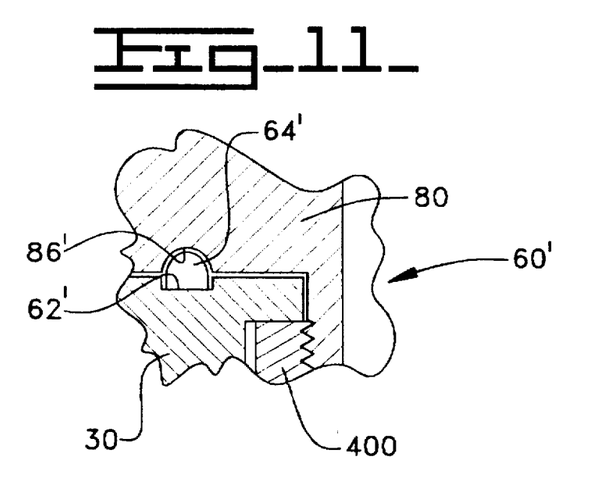
FIG. 11 is a diagrammatic sectional side view of the indexing means disposed in a recess in the top plate and the filter mounting base when the filter assembly is in position, according to the preferred embodiment of the present invention.
Figure 12:
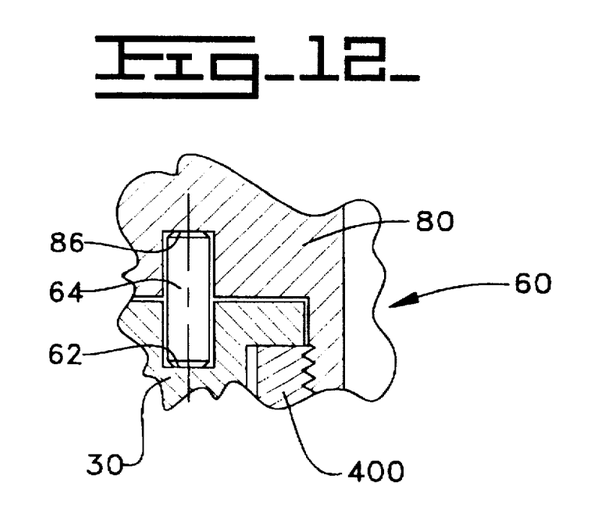
FIG. 12 is a diagrammatic sectional side view of the indexing means disposed in a recess in the top plate and the filter mounting base when the filter assembly is in position, according to another embodiment of the present invention.

As illustrated in FIG. 12, in the preferred embodiment, the guide pin is preferably a cylindrical rod, and the top plate recess and filter mounting base recess are both cylindrical bores, respectively. In one embodiment, the guide pin has a diameter of about 5 mm and a length of about 20 mm. These dimensions can be changed according to the overall dimensions of the top plate and the filter assembly. The top plate bore has a length of about 10 mm and a diameter sufficient for press fitting the guide pin therein. Preferably, the top plate bore has a diameter that is about 0.03 mm to about 0.08 mm greater than the guide pin diameter to facilitate a press fit. The guide pin is press-fitted into the top plate bore so that the pin is held rigidly in the top plate and protrudes from the surface of the top plate by a length of about 10 mm. The corresponding recess in the mounting base 80 preferably has a diameter that is about 0.10 mm to about 0.50 mm greater than the guide pin diameter, to facilitate the guide pin to slip-fit into the recess. An alternate indexing means 60 is illustrated in FIG. 11, showing a semi-circular key 64' located in a recess 62' in the top plate 30 and a corresponding recess 86' in the filter mounting base 80.

The top plate 30 also includes a centrally located fluid outlet opening 36, as illustrated in FIGS. 1, 2 and 3a, sized to slip fit onto the external threads 82 on the filter mounting base 80. Desirably, the opening 36 has a diameter which is no more than about 3 mm greater than the diameter of the threads 82, and preferably about 1.5 mm greater. If the opening 36 is too large, the filter assembly will tend to shift with respect to the filter mounting base and the sealability of the filter assembly to the base will be detrimentally compromised.

In the preferred embodiment, top plate 30 has a circumferential annular channel 37 surrounding the fluid outlet opening 36 as illustrated in FIG. 1 and FIG. 3a. The annular channel 37 has a second sealing ring 72 disposed therein.

Preferably, the sealing ring 72 has a circular cross section and is made from an injection molded elastomeric material, desirably a nitrile rubber. The sealing ring may have other cross section geometries and may be made from a variety of different elastomers, such as hydrogenated nitrile rubber, for example, depending on the desired elastomer properties such as heat resistance, low compression set and/or low brittle point. In the preferred embodiment, the sealing ring 72 has a diameter in the range of about 2 mm to about 4 mm. Further, in the preferred embodiment, the second sealing ring 72 is biased against the circumferential sealing surface means 84 of the mounting base 80 to create a second seal when the top plate 30 is urged towards the base 80.

The top plate 30 also includes means for preventing excessive tightening of the housing 20 to the top plate 30, for preventing excessively tight threaded connection core 40 with member 400, for preventing excessive compression of third sealing ring 530, and for indicating positive sealing, when the core 30 is threaded into attachment member 400. Preferably, as shown in FIG. 3a, the means include a mechanical stop 38 formed on the top plate. The mechanical stop 38 provides a mechanical contact between the top plate assembly and the open end of the cylindrical housing. Preferably, sealing surface 510 is formed adjacent mechanical stop 38, when the sealing engagement means have a configuration as shown in FIG. 4 and FIG. 5. A plurality of ribs 39,39',39" are provided on the inner surface of the top plate 30. The ribs 39 have a length oriented in a radial direction and have a depth oriented in the axial direction, as shown in FIG. 3a.

The replaceable coreless filter element 50 is disposed in housing 20 to define a fluid inlet chamber 52 between the filter element and the housing. The filter element 50 includes a hollow cylindrical fluid outlet chamber 53 which opens to a first open end 54, and a second end 55. The first open end 54 allows filtered fluid to flow through it. The filter element 50 preferably has an outer diameter that is smaller than the inner diameter of housing 20 to allow removal of the filter element 50 through the open end 24 of the housing. Further, the filter element 50 also has an inner diameter that is larger than the outer diameter of the hollow central core 40. Desirably, the filter element 50 has an inner diameter larger than each of the diameter of the first outer surface 42 of first end 43 and second outer surface 470 of second end 47 of the central core 40, and preferably, in the range of about 1% to about 10% larger. The larger inner diameter of the filter element allows the hollow cylindrical fluid outlet chamber 53 to accept the hollow central core 40 therein. If the filter element inner diameter is less than about 1% larger than the first outer surface diameter of the core, the filter will be difficult to install. If the filter element inner diameter is greater than about 10% larger than the first outer surface diameter of the core, the filter will be too loosely placed in the housing and an unevenly spaced fluid chamber will result. Preferably, the annular end caps 56,57 have an inner diameter in the range of 1% to 5% smaller than the outer diameter of surfaces 42,470. If the diameter of end caps 56,57 is more than 5% smaller, the resilient inner sealing surfaces 59,59' of respective end caps 56,57 may get damaged or torn off as they stretch to seal against respective surfaces 42,470 of core 40 when the filter is mounted onto the central core. If the diameter of end caps 56,57 is less than 1% smaller, the resilient inner sealing surfaces 59,59' of respective end caps 56,57 will detrimentally not seal well against respective surfaces 42,470 of core 40 when the filter is mounted onto the central core.

The filter media can be made from a variety of materials, such as paper or synthetic fibers, for example and the present invention is not limited in its scope, to any particular type of filtration media.

Figure 3B:
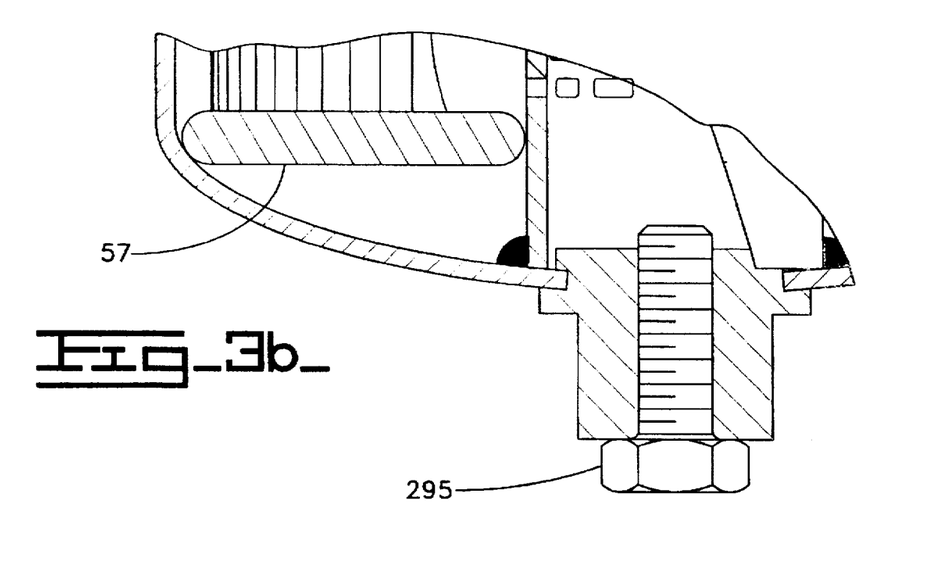

In the preferred embodiment, as illustrated in FIG. 3a and 3b, the filter element has an annular end cap 56 on the open end 54, and an annular end cap 57 on the second end 55. The end caps 56,57 are made from elastomeric materials. Preferably, end caps 56,57 are made from polyurethanes having a hardness in the range of about 70 Shore A to 85 Shore A durometer. End cap 56 has a resilient inner edge 58 defined by an opening in the end cap to the hollow cylindrical chamber. The resilient inner edge provides a sealing surface 59.

In the preferred embodiment, as shown in FIG. 3a, when the filter element is snugly fitted onto the central core 40, sealing surfaces 59,59' of element 50 are respectively biased against first and second outer surfaces 42,470 of core 40 and provide a radial seal with surface 42,470. The fluid outlet perforations 45,45',45" of core 40 are also in fluid communication with the hollow cylindrical fluid outlet chamber 53. Also, the surface of end cap 56 is biased against the ribs 39,39' on the inner surface of the top plate. This helps the filter element to fit snugly onto the top plate and the hollow central core. Further, in this position, the fluid inlet holes 35,35' in top plate 30 are in fluid communication with the fluid inlet chamber 52.

As illustrated in FIG. 3b., when the housing is connected to member 400 and sealed against the top plate, end cap 57 on the closed end of the filter is biased against the interior surface 28 of the closed end 25 of the housing. This helps the filter element to fit snugly inside the housing and helps maintain a constant geometry of the fluid inlet chamber 52. Preferably, the second end cap has a plurality of integrally molded urethane tabs that bias against the housing surface 28. In the preferred embodiment, there are three integrally molded tabs on end cap 57.

It should be understood that the present invention is not limited to the preferred embodiment. One skilled in the art may make changes to the size, shape and material of construction of the components within the principles of this invention and to the extent provided by the broad meaning of the appended claims.

Industrial Applicability

The fluid filter assembly 10 is assembled in the following manner. The top plate assembly 30, having an indexing guide pin 60, is mounted on the filter mounting base 80 attached to, say, the engine block, by threading the top plate attachment member 400 to corresponding threads on base 80. Then, the coreless filter element 50 is mounted onto the hollow central core 40 of housing 20, and the resilient urethane end caps 56,57 of the filter element respectively seal against the first and second outer surfaces 42,470 of core 40. The housing 20 is then connected to top plate 30 by threading the threads 406 or 407 of core 40 into corresponding threads 443 or 444 respectively of member 400. The housing is tightened by a tool engaged around the drain plug housing 29. The sealing between the top plate and the mounting base occurs by a nitrile rubber seal 72. The sealing engagement between the top plate and the housing occurs by one or more of nitrile rubber seals 71 and 530.

The top plate 30 and attachment member 400 both remain attached to the mounting base on, say, the engine block. Any clockwise or anti-clockwise rotational movement of the top plate with respect to the mounting base is prevented by the indexing pin.

The contaminated and dirty engine oil enters the filter assembly through the fluid inlet holes 35,35' and flows into the fluid inlet chamber 52. The fluid is filtered as it passes radially inward from the fluid inlet chamber 52, through the filtration media, and through the perforations 45,45',45" in the hollow central core 40, into the hollow cylindrical fluid outlet chamber 53. The clean, filtered oil flows through the hollow central core 40, and through the top plate outlet 36 and exits filter assembly 10.

When the filter has to be serviced, the used oil is first drained through the drain plug housing 29 after removing the plug 29S, into an environmentally safe disposable container. When the oil has been fully drained from the filter assembly, the housing is disconnected from the top plate. The coreless filter element is replaced with a new coreless element, and new seals 71 and/or 530 are installed prior to reconnecting the housing to the top plate. The used filter element is disposed in an environmentally safe manner, such as incineration.

To facilitate smooth installation, one may apply a thin layer of oil or other lubrication on the inner surfaces 59,59' of the end caps 56,57 respectively.

The present invention is particularly useful for making oil filters for internal combustion engines used in off-highway trucks, construction equipment, marine applications, power generation equipment, buses, general freight trucks and upper-end recreational vehicles. The present invention is also useful for making hydraulic fluid filters for use in the hydraulic systems of various earth-moving and construction equipment, and fuel filters.

Other aspects, objects and advantages of this invention can be obtained from a study of the drawings, the disclosure and the appended claims.

I claim:

1. A reusable fluid filter assembly, comprising:

a cylindrical housing having an annular peripheral wall coaxially surrounding a central axis, an open end, a closed end, sealing engagement means for sealingly engaging said housing to a top plate assembly, and a hollow central core having a tubular shape coaxially surrounding said central axis, an inner surface, an open first end having a first outer surface, a middle portion having a middle outer surface and a plurality of fluid outlet perforations extending from said inner surface to said middle outer surface, and a second end having a second outer surface, said first end being disposed in said open end of said housing and said second end being connected to said closed end of said housing;

a top plate assembly having a rim, fluid inlet means and fluid outlet means extending through said top plate assembly, and corresponding sealing engagement means for sealingly engaging said top plate assembly to said housing;

a top plate attachment member having a tubular shape, an outer surface, a pilot end having internal threads for threading onto corresponding external threads on a filter mounting base, and a fluid outlet port extending through said attachment member;

a replaceable coreless filter element disposed in said housing to define a fluid inlet chamber between said filter element and said housing, said filter element having a hollow cylindrical fluid outlet chamber which opens to a first open end of said filter element, allowing filtered fluid to flow therefrom, and having a second open end, said filter element having an outer diameter that is smaller than the inner diameter of said housing to allow removal of said filter element through the open end of said housing, and said filter element having an inner diameter that is larger than the outer diameter of said hollow central core to allow said hollow cylindrical chamber to accept said hollow central core therein;

said fluid inlet means of said top plate being in fluid communication with said fluid inlet chamber defined by said filter element and housing;

said hollow central core extending into said first open end and said hollow cylindrical chamber of said filter element, said fluid outlet perforations of said hollow central core being in fluid communication with said hollow cylindrical chamber of said filter element;

said first and second outer surfaces of said hollow central core sealingly engaging said first and second open ends of said filter element respectively;

said first end of said hollow central core having threads adjacent said open first end for mating with corresponding threads adjacent said fluid outlet port of said attachment member, for removably connecting said housing to said top plate attachment member; and wherein the sealing engagement means of said housing includes (i) a radial annular channel adjacent said open end of said housing, said radial annular channel having a depth along a radial direction with respect to said central axis, and a first sealing ring disposed in said radial annular channel, and (ii) an axial annular channel in the housing peripheral wall at the open end of said housing, said axial annular channel having a depth along an axial direction with respect to said central axis, and a second sealing ring disposed in said axial annular channel.

2. A fluid filter assembly, as set forth in claim 1, wherein said top plate sealing engagement means include a peripheral sealing surface formed on said top plate assembly.

3. A fluid filter assembly, as set forth in claim 2, wherein said first sealing ring forms a first seal in cooperation with said peripheral sealing surface when the threads adjacent the first outer surface of said hollow central core are threaded into the corresponding threads adjacent the fluid outlet port of said attachment member.

4. A fluid filter assembly, as set forth in claim 1, wherein said top plate sealing engagement means include a circumferential sealing surface adjacent said rim.

5. A fluid filter assembly, as set forth in claim 4, wherein said second sealing ring forms a second seal in cooperation with said circumferential sealing surface when the threads adjacent the first outer surface of said hollow central core are threaded into the corresponding threads adjacent the fluid outlet port of said attachment member.

6. A fluid filter assembly, as set forth in claim 1, including means for preventing excessive tightening of said housing to said top plate attachment member and indicating positive sealing when said central core of said housing is threaded into said top plate, said means including a mechanical stop formed on said top plate core, said mechanical stop providing a mechanical contact between said top plate and said open end of said housing.

7. A fluid filter assembly, as set forth in claim 1, wherein said assembly includes indexing means for preventing rotation of said top plate with respect to said filter mounting base after said top plate has been secured to said filter mounting base.

8. A fluid filter assembly, as set forth in claim 7, wherein said indexing means include at least one recess in said top plate, said recess being adapted to receive a guide pin for mating with a corresponding recess in said filter mounting base.

9. A fluid filter assembly, as set forth in claim 8, wherein said guide pin is fitted in said top plate recess and said filter mounting base recess when said top plate is sealably attached to said filter mounting base.

10. A fluid filter assembly, as set forth in claim 8, wherein said guide pin is a cylindrical rod and said top plate and filter mounting base recesses are cylindrical bores.

11. A fluid filter assembly, as set forth in claim 1, wherein said top plate has a circumferential annular channel surrounding said fluid outlet opening, and a third sealing ring disposed therein, whereby said filter mounting base has a circumferential sealing surface to correspond with said third sealing ring.

12. A fluid filter assembly, as set forth in claim 11, whereby said third sealing ring is biased against the circumferential sealing surface of said filter mounting base to create a third seal when said top plate assembly is urged towards said filter mounting base.

13. A fluid filter assembly, as set forth in claim 1, wherein the open first end of said hollow central core includes external threads for threading onto corresponding internal threads on said top plate attachment member.

14. A fluid filter assembly, as set forth in claim 1, wherein the open first end of said hollow central core includes internal threads for threading onto corresponding external threads on said top plate attachment member.

15. A fluid filter assembly, as set forth in claim 1, wherein the fluid outlet means of said top plate include a centrally located fluid outlet opening sized to slip fit onto external threads on said filter mounting base, and said top plate attachment member has an outer diameter larger than the fluid outlet opening of said top plate.

16. A fluid filter assembly, as set forth in claim 1, wherein the fluid outlet means of said top plate include a centrally located circular fluid outlet opening having an inner diameter sized to fit around external threads on said filter mounting base, and said top plate attachment member has a pilot diameter, an outer diameter, and a shoulder formed between said pilot diameter and said outer diameter, said pilot diameter being of a size sufficient to slip fit inside the inner diameter of said top plate fluid outlet, and said shoulder forming a mechanical contact with said top plate when the internal threads of the pilot end of said attachment member are threaded into corresponding external threads on said filter mounting base.

17. A fluid filter assembly, as set forth in claim 1, including a drain plug in the closed end of said cylindrical housing.

18. A fluid filter assembly, as set forth in claim 1, wherein said cylindrical housing has a first wall portion and a second wall portion, said first wall portion originating from the open end of said housing and extending for an axial length no greater than about one-third the outer diameter of said cylindrical housing.

19. A fluid filter assembly, as set forth in claim 1, wherein said replaceable coreless filter element has first and second annular end caps on said open first and second ends respectively, said annular end caps being made from elastomeric materials, said first and second annular end caps having respective first and second resilient inner edges, said resilient inner edges providing respective first and second sealing surfaces, said first and second sealing surfaces providing a radial seal with said respective first outer surface and second outer surface of said hollow central core.

20. A fluid filter assembly, as set forth in claim 19, wherein said first annular end cap is biased against said top plate, and said second annular end cap is biased against an interior surface of the closed end of said housing.

* * * * *